United States Patent
Yi et al.

(10) Patent No.: US 9,396,381 B2
(45) Date of Patent: *Jul. 19, 2016

(54) METHOD AND APPARATUS FOR OPTICAL FINGERPRINT RECOGNITION USING MULTIPLE SCAN

(71) Applicant: SUPREMA INC., Gyeonggi-do (KR)

(72) Inventors: Jinwook Yi, Gyeonggi-do (KR); Hochul Shin, Gyeonggi-do (KR); Kideok Lee, Gyeonggi-do (KR); BoGun Park, Gyeonggi-do (KR); Bong Seop Song, Gyeonggi-do (KR); Jae Won Lee, Gyeonggi-do (KR)

(73) Assignee: SUPREMA INC., Gyeonggi-Do (KR)

( * ) Notice: Subject to any disclaimer, the term of this patent is extended or adjusted under 35 U.S.C. 154(b) by 162 days.

This patent is subject to a terminal disclaimer.

(21) Appl. No.: 13/918,000

(22) Filed: Jun. 14, 2013

(65) Prior Publication Data
US 2014/0286545 A1 Sep. 25, 2014

(30) Foreign Application Priority Data
Mar. 22, 2013 (KR) .................. 10-2013-0031058

(51) Int. Cl.
*G06K 9/00* (2006.01)

(52) U.S. Cl.
CPC ........ *G06K 9/00067* (2013.01); *G06K 9/00046* (2013.01)

(58) Field of Classification Search
None
See application file for complete search history.

(56) References Cited

U.S. PATENT DOCUMENTS

| 4,827,527 A * | 5/1989 | Morita et al. ................. 382/127 |
| 8,320,663 B2 | 11/2012 | Bodnar et al. |
| 2001/0031075 A1* | 10/2001 | Fujii ............................. 382/125 |
| 2002/0021827 A1* | 2/2002 | Smith ........................... 382/124 |
| 2003/0012451 A1* | 1/2003 | Shigeta .................. H04N 5/367 382/274 |

(Continued)

FOREIGN PATENT DOCUMENTS

| KR | 10-2001-0035295 A | 5/2001 |
| KR | 10-2009-0053937 | 5/2009 |
| WO | WO 2008028045 A2 * | 3/2008 |

OTHER PUBLICATIONS

Kim, Ji-Hun, Machine Translation of KR 10-2001-0035295, publication date May 7, 2001.*

*Primary Examiner* — Siamak Harandi
*Assistant Examiner* — Narek Zohrabyan
(74) *Attorney, Agent, or Firm* — Bacon & Thomas, PLLC (57) ABSTRACT

A method for an optical fingerprint recognition, the method includes scanning a fingerprint image using a multiple scan which allows alternating a first scan condition and a second scan condition different from each other; determining whether an input fingerprint is a dry fingerprint depending on a darkness level of a fingerprint image derived from the first scan condition; and performing a fingerprint recognition using a fingerprint image derived from the first scan condition or a fingerprint image derived from the second scan condition in accordance with the determination result as to the dry fingerprint.

10 Claims, 5 Drawing Sheets

(56) References Cited

U.S. PATENT DOCUMENTS

| | | | |
|---|---|---|---|
| 2003/0118218 A1* | 6/2003 | Wendt et al. | 382/124 |
| 2003/0133103 A1* | 7/2003 | Arnold et al. | 356/237.2 |
| 2003/0169905 A1* | 9/2003 | Butterworth | 382/115 |
| 2003/0206287 A1* | 11/2003 | McClurg et al. | 356/71 |
| 2004/0228508 A1* | 11/2004 | Shigeta | G06K 9/00026 382/124 |
| 2005/0105785 A1* | 5/2005 | Shigeta | 382/124 |
| 2005/0169506 A1* | 8/2005 | Fenrich | G06K 9/00026 382/127 |
| 2005/0271258 A1* | 12/2005 | Rowe | G06K 9/00046 382/124 |
| 2006/0008129 A1* | 1/2006 | Lee | G06K 9/00912 382/124 |
| 2006/0056700 A1* | 3/2006 | Abiko et al. | 382/190 |
| 2006/0110011 A1* | 5/2006 | Cohen et al. | 382/115 |
| 2007/0258629 A1* | 11/2007 | Bartsch | G06K 9/00067 382/128 |
| 2007/0286464 A1* | 12/2007 | Jayanetti et al. | 382/124 |
| 2012/0300992 A1* | 11/2012 | Ivanov et al. | 382/124 |
| 2013/0202182 A1* | 8/2013 | Rowe | A61B 10/02 382/133 |
| 2014/0153791 A1* | 6/2014 | Kim et al. | 382/124 |
| 2014/0212008 A1* | 7/2014 | Hatcher, II | G06K 9/22 382/124 |
| 2014/0286544 A1* | 9/2014 | Yi | G06K 9/00013 382/124 |
| 2014/0286548 A1* | 9/2014 | Shin | G06K 9/00114 382/127 |
| 2015/0178545 A1* | 6/2015 | Thorsted | G06K 9/00026 382/124 |
| 2015/0205992 A1* | 7/2015 | Rowe | G06K 9/2018 382/124 |

\* cited by examiner

METHOD AND APPARATUS FOR OPTICAL FINGERPRINT RECOGNITION USING MULTIPLE SCAN

RELATED APPLICATIONS

This application claims the benefit of Korean Patent Application No. 10-2013-0031058, filed on Mar. 22, 2013, which is hereby incorporated by reference as if fully set forth herein.

FIELD OF THE INVENTION

The present invention relates to a method and apparatus for an optical fingerprint recognition using a multi scan, and more particularly, to a method and apparatus for an optical fingerprint recognition using a multiple scan with different scan conditions to enhance adaptability to dry fingerprints.

BACKGROUND OF THE INVENTION

As is known, a user authentication by a fingerprint recognition is not only convenient to use but also excellent in terms of a security and cost-effectiveness and is broadly commercialized now. A device for acquiring a fingerprint image is generally classified into a semiconductor type device using semiconductor touch sensors and an optical device using optical sensors. Of these devices, an optical sensor has a strong durability (a scratch resistance, chemical resistance, abrasion resistance, and shock resistance) and exhibits a high recognition rate due to the visibility of an image (an image resolution), and thus the optical device is more preferred.

Among optical fingerprint recognition apparatus employing the optical sensor, an absorbent optical fingerprint recognition apparatus has a configuration in which an incident light on a portion with which a fingerprint does not come in contact is totally reflected from a surface of a prism and an incident light on ridges is refracted from or absorbed in moisture or oil, thereby resulting in condensing on the lens only a very small amount of light. As a result, in principle, the ridges portions have got filmed in a dark image, and the portions of the valleys or non-contact portions of a fingerprint have got filmed in a bright image. According to this basic principle, when the ridge portions of the fingerprint being confronted with the surface of the prism is dry, the contact area becomes reduced and medium such as moisture, oil or the others to refract and absorb the light also becomes lessened. As a result, the absorption optical fingerprint recognition apparatus has a disadvantage that the amount of light in total reflection increases and thus the fingerprint image that is filmed is unclear or blurred. In other words, an absorption optical system is vulnerable to a dry fingerprint and thus a dispersive optical system began to be used as a way to overcome these shortcomings.

The dispersive optical system acts in opposition in comparison with the absorption optical system, in principle. The dispersive optical system includes a material such as a black lacquer that absorbs light, such as a black lacquer, on one side of a prism, and condenses on lens the light scattered at the ridges portions of the fingerprint contacted thereto. As a result, as opposed to the absorption optical system, the dispersive optical system exhibits a property that the ridge portions is filmed in a bright image and the valley portions or non-contacted portions with the fingerprint are filmed in a dark image.

However, despite of the use of the dispersive optical system, it does not solve the fundamental vulnerability to the dry fingerprint, but it merely improves a portion of the characteristic of the dry fingerprint.

On the other hand, an AGC (Adaptive Gain Control) has been introduced to improve the vulnerability to the dry fingerprint.

The AGC is a technique to adjust again which represents an exposure time and the amplification ratio of camera sensors, and collectively refers to a process looking for an optimal fingerprint image while reducing the exposure value of a camera when it is judged that an image which is captured is not suitable for a fingerprint recognition.

However, the AGC has two main drawbacks.

First, it takes a long time to capture a fingerprint image, and the state (shape) of the fingerprint continues to change in the course of feedback. This is caused by the characteristics of the AGC to determine the suitability for the captured image, apply a new exposure value to the captured image based on the determination, and perform cyclically repeatedly the determination and analysis on an image which has been changed again until an optimal exposure value is obtained. As such, the AGC is to acquire a dry fingerprint image with a better quality by raising the contrast between images through a feedback process.

Second, a reference background image (background image without a fingerprint) for a background processing to be subjected to an optimal image processing is obtained under a normal exposure. Accordingly, there occurs a problem that the reference background image is no longer used when the exposure is changed arbitrarily. Moreover, in the above case, because a fingerprint to be captured, i.e., a finger has already been put on an optical system when the AGC is being executed, it does not newly obtain a blank image needed for the background processing.

SUMMARY OF THE INVENTION

In view of the above, in order to solve the above described problems, the present invention provides a method and apparatus for an optical fingerprint recognition, which scans a fingerprint image using a multiple scan with different scan conditions and uses fingerprint images different from each other for a fingerprint recognition depending on the determination of a dry fingerprint.

The present invention will not be limited to the above, and another object to be solved, which has not been described, will be clearly understood to those skilled in the art from the following description.

In accordance with an exemplary embodiment of the present invention, there is provided a method for an optical fingerprint recognition, the method includes: scanning a fingerprint image using a multiple scan which allows alternating a first scan condition and a second scan condition different from each other; determining whether an input fingerprint is a dry fingerprint depending on a darkness level of a fingerprint image derived from the first scan condition; and performing a fingerprint recognition using a fingerprint image derived from the first scan condition or a fingerprint image derived from the second scan condition in accordance with the determination result as to the dry fingerprint.

In the exemplary embodiment, wherein said scanning a fingerprint image using a multiple scan includes applying the first scan condition and the second scan condition in sequence within one frame.

In the exemplary embodiment, wherein said scanning a fingerprint image using a multiple scan includes applying the first scan condition and the second scan condition in sequence in a frame unit.

In the exemplary embodiment, wherein the first scan condition is a normal exposure condition permitting a predetermined exposure time, and the second scan condition is a long exposure condition permitting an exposure time longer than the predetermined exposure time.

In the exemplary embodiment, wherein the first scan condition is a normal exposure condition permitting a predetermined exposure time, and the second scan condition is a normal exposure condition accompanied by a gain control or gamma control.

In the exemplary embodiment, wherein the first scan condition is a normal exposure condition permitting a predetermined exposure time, and the second scan condition is a long exposure condition permitting an exposure time longer than the predetermined exposure time and being accompanied by a gain control or gamma control.

In the exemplary embodiment, performing a fingerprint recognition includes straightly applying the fingerprint image derived from the second scan condition to the fingerprint recognition.

In the exemplary embodiment, wherein said performing a fingerprint recognition includes synthesizing the fingerprint image derived from the first scan condition and the fingerprint image derived from the second scan condition; and applying the synthesized fingerprint image to the fingerprint recognition.

In the exemplary embodiment, wherein said performing a fingerprint recognition includes defining a following exposure time using the difference between the fingerprint image derived from the first scan condition and the fingerprint image derived from the second scan condition; scanning a fingerprint image newly under a scan condition having the following exposure time; and applying the newly scanned fingerprint image to the fingerprint recognition.

In accordance with another aspect of the exemplary embodiment of the present invention, there is provided an apparatus for an optical fingerprint recognition, the apparatus includes a fingerprint image scanning unit configured to multiply scan a fingerprint image using a first scan condition and a second scan condition different from each other; a scan condition setting unit configured to set a scan condition which allows alternating the first scan condition and the second scan condition at the time of scanning the fingerprint image; an image determination unit configured to determine whether an input fingerprint is a dry fingerprint depending on a darkness level of a fingerprint image derived from the first scan condition; and a fingerprint recognition module configured to perform the fingerprint recognition using a fingerprint image derived from the first scan condition or a fingerprint image derived from the second scan condition in accordance with the determination result as to the dry fingerprint.

In the exemplary embodiment, wherein the fingerprint image scanning unit is configured to apply the first scan condition and the second scan condition in sequence within one frame.

In the exemplary embodiment, wherein the fingerprint image scanning unit is configured to apply the first scan condition and the second scan condition in sequence in a frame unit.

In the exemplary embodiment, wherein the first scan condition is a normal exposure condition permitting a predetermined exposure time, and the second scan condition is a long exposure condition permitting an exposure time longer than the predetermined exposure time.

In the exemplary embodiment, wherein the first scan condition is a normal exposure condition permitting a predetermined exposure time, and the second scan condition is a normal exposure condition accompanied by a gain control or gamma control.

In the exemplary embodiment, wherein the first scan condition is a normal exposure condition permitting a predetermined exposure time, and the second scan condition is a long exposure condition permitting an exposure time longer than the predetermined exposure time and being accompanied by a gain control or gamma control.

In the exemplary embodiment, wherein the fingerprint recognition module is configured to apply straightly the fingerprint image derived from the second scan condition to the fingerprint recognition.

In the exemplary embodiment, wherein the fingerprint recognition module is configured to synthesize the fingerprint image derived from the first scan condition and the fingerprint image derived from the second scan condition to apply the synthesized fingerprint image to the fingerprint recognition.

In the exemplary embodiment, wherein the fingerprint recognition module is configured to define a following exposure time using the difference between the fingerprint image derived from the first scan condition and the fingerprint image derived from the second scan condition and apply a newly scanned fingerprint image, that has been scanned newly by the fingerprint image scanning unit in compliance with an exposure having the following exposure time, to the fingerprint recognition.

As described above, the embodiments of the present invention scan a fingerprint image using a multiple scan and use the fingerprint images different from each other for the fingerprint recognition depending on the presence of a dry fingerprint.

As a result, unlike the conventional arts, the embodiments of the present invention does not require a feedback for acquiring additional information and conduct the AGC and therefore exhibits an effect to recognize the fingerprint with reliability in relatively fast time over the conventional arts.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Hereinafter, the embodiments of the present invention will be described in detail with reference to the accompanying drawings which form a part hereof.

Before explaining the embodiments of the present invention, first, the terms of "normal exposure condition" and "short exposure condition" as used herein are defined as follows. Person's fingerprints may be classified into "dry fingerprint" and "general fingerprint", and "wet fingerprint" based on statistics for their dryness, where "general fingerprint" may commonly refer to as "a standard fingerprint". When the "dry fingerprint" or "wet fingerprint" is input for a fingerprint recognition, it is typical to increase or decrease an exposure time than usual in order to improve a recognition rate. For example, in a case where "general fingerprint" is input, the fingerprint recognition is performed using an exposure time the same as usual without adjusting the exposure time, and an exposure condition taking just the exposure time is defined herein as "normal exposure condition". Meanwhile, the other exposure condition taking an exposure time shorter than the "normal exposure condition" is defined as "short exposure condition".

As described above, the foregoing terms are defined in consideration of functions in the embodiments of the invention, and may vary in accordance with the intentions of a user or an operator or according to usual practice. Therefore, the definitions of the terms should be interpreted on the basis of the entire content of the specification.

Figure 1:
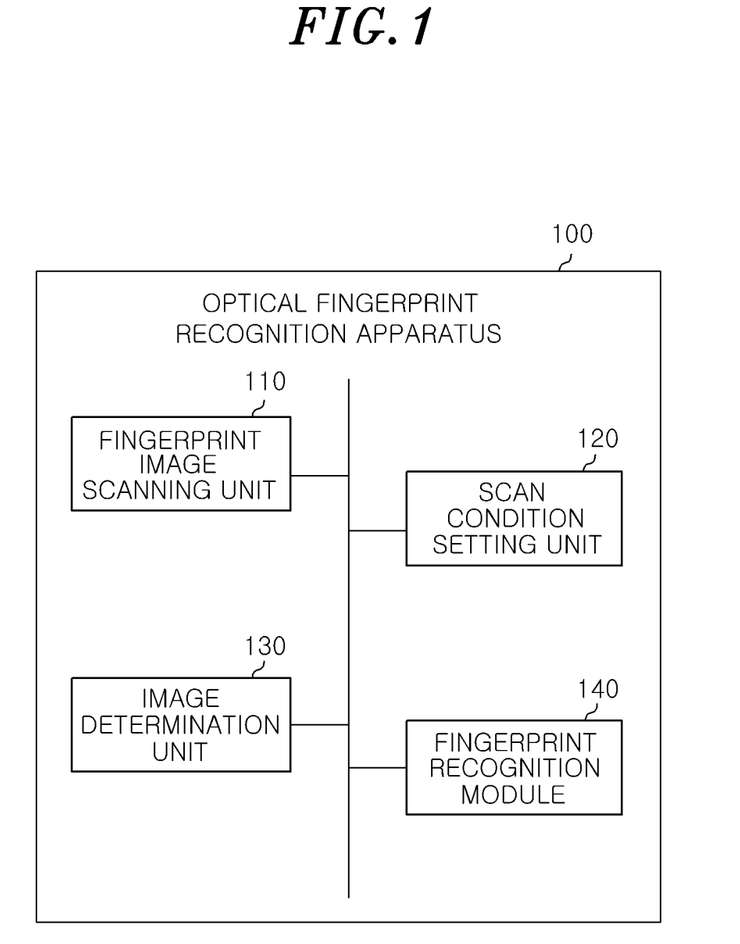
FIG. 1 is a block diagram of an optical fingerprint recognition apparatus using a multiple scan in accordance with an embodiment of the present invention.
Figure 2:
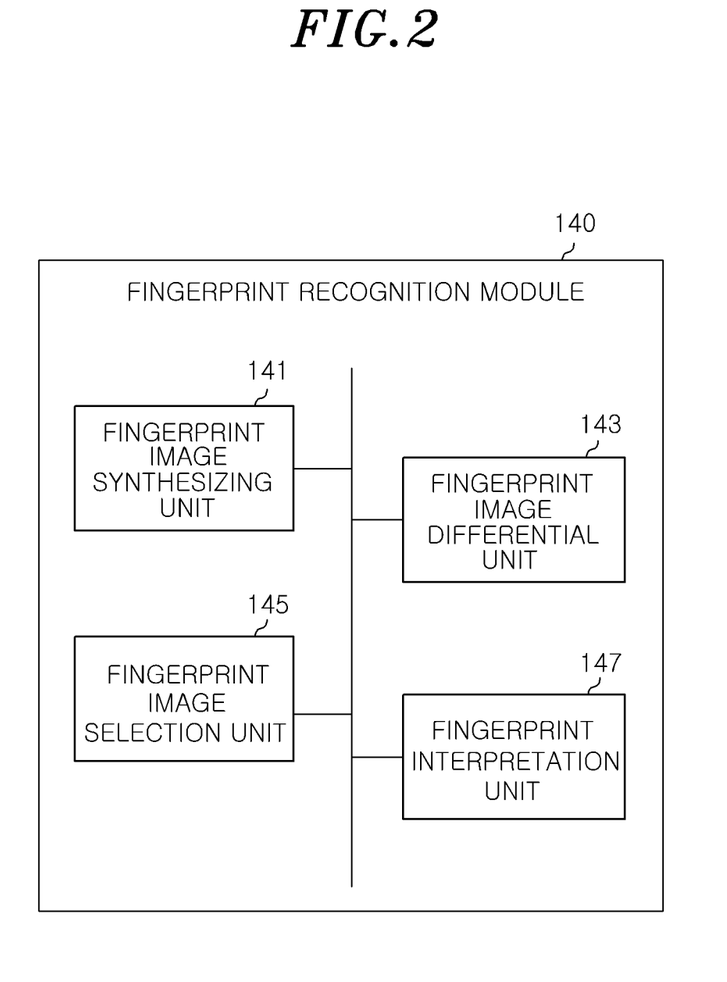
FIG. 2 is a detailed block diagram of the fingerprint recognition module shown in FIG. 1.

FIG. 1 is a block diagram of an optical fingerprint recognition apparatus using a multiple scan in accordance with an embodiment of the present invention, and FIG. 2 is a detailed block diagram of the fingerprint recognition module shown in FIG. 1.

As illustrated in FIG. 1 and FIG. 2, an optical fingerprint recognition apparatus 100 includes a fingerprint image scanning unit 110, a scan condition setting unit 120, an image determination unit 130, and a fingerprint recognition module 140.

The fingerprint image scanning unit 110 scans a fingerprint image separately using a multiple scan which has scan conditions different from with each other. The fingerprint image scanning unit 110 may scan the fingerprint image under the first scan condition and second scan condition which has been set by the scan condition setting unit 120. For example, the fingerprint image scanning unit 110 may scan the fingerprint image while changing the first scan condition and the second scan condition in sequence within one frame unit, or may scan the fingerprint image while changing the first scan condition and the second scan condition in sequence within a frame unit. In addition, the fingerprint scanning unit 110 may scan the fingerprint image while applying another scan condition when the image determination unit 130 determines that an input fingerprint to be recognized is a dry fingerprint.

The scan condition setting unit 120 sets a scan condition which allows alternating the first scan condition and the second scan condition when the fingerprint image scanning unit 110 scans the fingerprint image. For example, the first scan condition may be a normal exposure condition permitting a predetermined exposure time, and the second scan condition may be a long exposure condition permitting an exposure time longer than the predetermined exposure time. Alternatively, the second scan condition may be a normal exposure condition accompanied by a gain control or gamma control. In this regard, a gamma refers to a slope of a straight line on a characteristic curve which represents the relationship between a log exposure and a density.

The image determination unit 130 determines whether an input fingerprint to be recognized is a dry fingerprint depending on a darkness level of the fingerprint image derived from the normal exposure.

The fingerprint recognition module 140 performs a fingerprint recognition using a fingerprint image derived from the first scan condition or a fingerprint image derived from the second scan condition in accordance with the determination result as to the dry fingerprint conducted by the image determination unit 130.

More specifically, when it is determined that the dry fingerprint is detected, the fingerprint recognition module 140 straightly applies the fingerprint image derived from the second scan condition to a fingerprint recognition. Alternatively, the fingerprint recognition module 140 synthesizes a fingerprint image derived from the first scan condition and a fingerprint image derived from the second scan condition and applies the synthesized fingerprint image to a fingerprint recognition. Alternatively, the fingerprint recognition module 140 defines a following exposure time using the difference between a fingerprint image derived from the first scan condition and a fingerprint image derived from the second scan condition and applies a fingerprint image, that has been newly scanned by the fingerprint image scanning unit 110 in compliance with an exposure condition having the following exposure time, to a fingerprint recognition. For example, in a case where fingerprint images are obtained, by the fingerprint scanning unit 110, using a normal exposure and the other exposure having a following exposure time in sequence in a next frame and the next but one frame, a fingerprint image derived from the other exposure having the following exposure time will be applied for the fingerprint recognition.

In order for an adaptive behavior to the determination of the dry fingerprint, as shown in FIG. 2, the fingerprint recognition module 140 includes a fingerprint image synthesizing unit 141, a fingerprint image differential unit 143, a fingerprint image selection unit 145, and fingerprint interpretation unit 147.

The fingerprint image synthesizing unit 141 synthesizes a fingerprint image derived from the first scan condition and a fingerprint image derived from the second scan condition when it is determined that the input fingerprint is the dry fingerprint and provides the synthesized fingerprint image to the fingerprint interpretation unit 147.

The fingerprint image differential unit 143 calculates a following exposure time using the difference between the fingerprint image derived from the first scan condition and the fingerprint image derived from the second scan condition when it is determined that the input fingerprint is the dry fingerprint. The calculated following exposure time is then provided to the scan condition setting unit 120.

The fingerprint image selection unit 145 selects any one among the fingerprint image derived from the first scan condition, the fingerprint image derived from the second scan condition, and the synthesized fingerprint image of the fingerprint images derived from the first scan condition and the second scan condition, or the fingerprint image derived from the calculated following exposure time, which is calculated by the fingerprint image differential unit 143, in accordance with the determination result as to the dry fingerprint conducted by the image determination unit 130. The selected fingerprint image is then provided to the fingerprint interpretation unit 147.

The fingerprint interpretation unit 147 performs a fingerprint interpretation and recognition with respect the fingerprint image selected by the fingerprint image selection unit 145.

Hereinafter, a method for an optical fingerprint recognition performed by the optical fingerprint recognition apparatus will be explained in detail with reference to FIGS. 1 to 5C.

Figure 3:
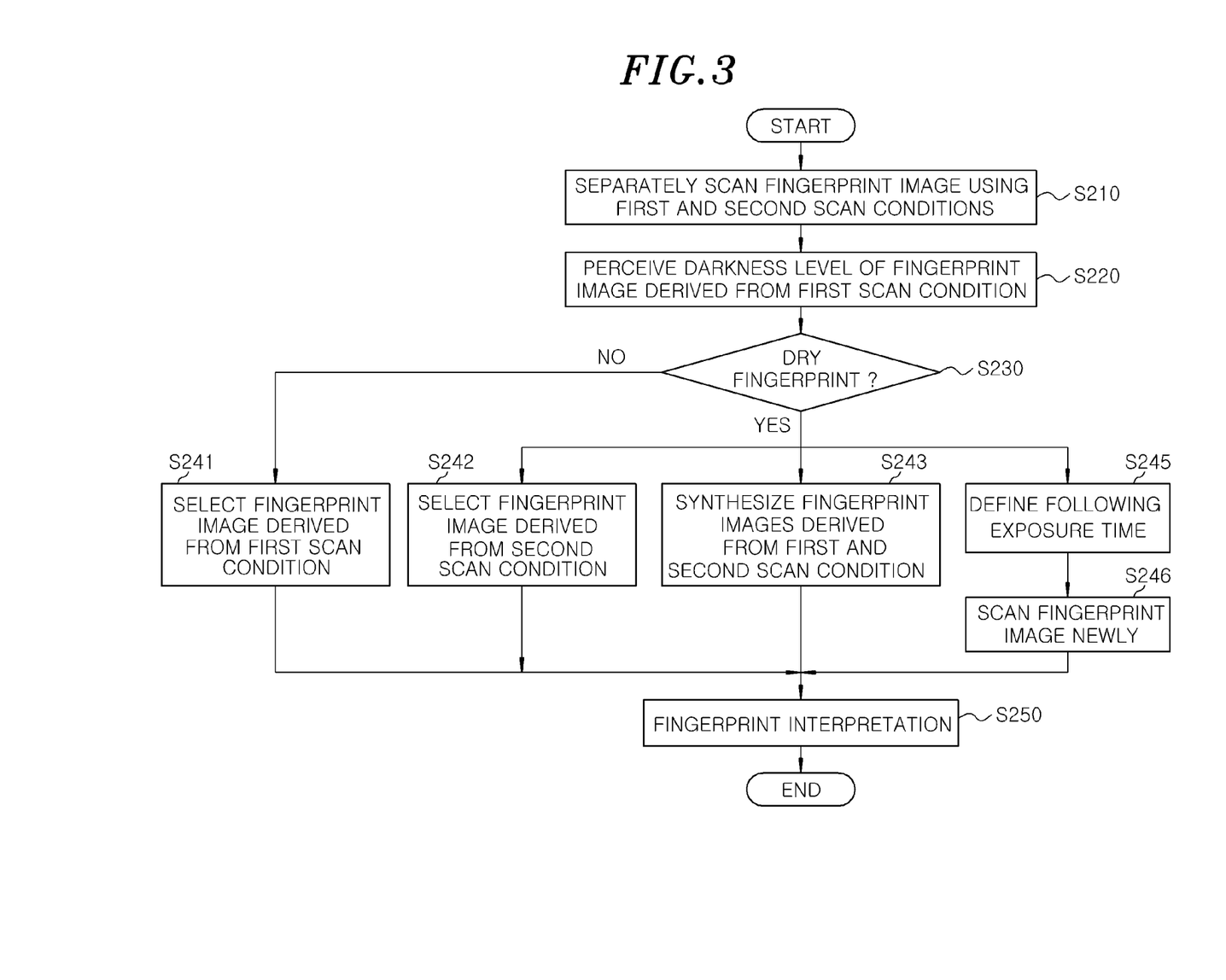
FIG. 3 is a flowchart illustrating a method for an optical fingerprint recognition using a multiple scan in accordance with an embodiment of the present invention.

First, the scan condition setting unit 120 sets a scan condition in which an exposure time is included, and the fingerprint image scanning unit 110 scans a fingerprint image using a multiple scan in compliance with the scan condition, which is set by the scan condition setting unit 120, in operation S210. The first scan condition may be a normal exposure condition permitting a predetermined exposure time, and the second scan condition may be a long exposure condition permitting an exposure time longer than the predetermined exposure time or a normal exposure condition accompanied by a gain control or gamma control.

Figure 4A:
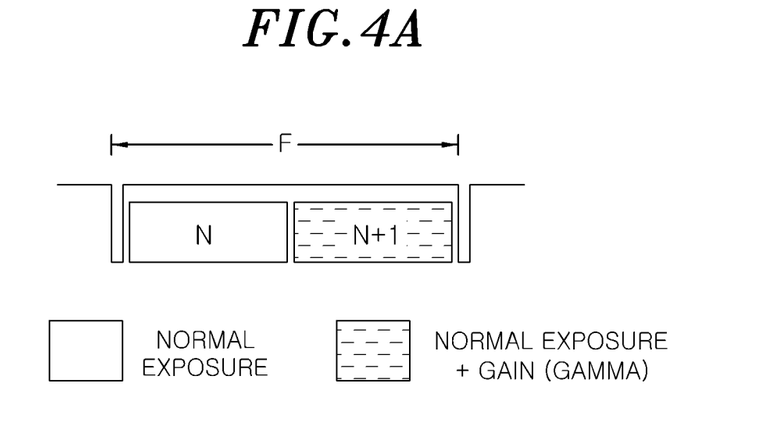
FIGS. 4A to 4C show diagrams of frames illustrating an example of a scanning process derived from a method for an optical fingerprint recognition using a multiple scan in accordance with an embodiment of the present invention.
Figure 4B:
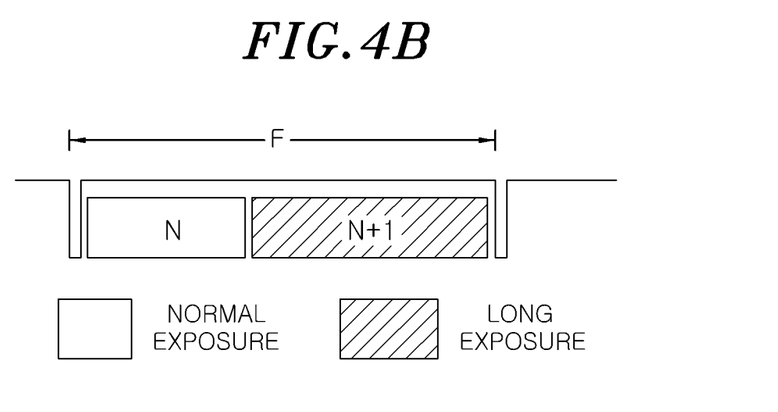
Figure 4C:
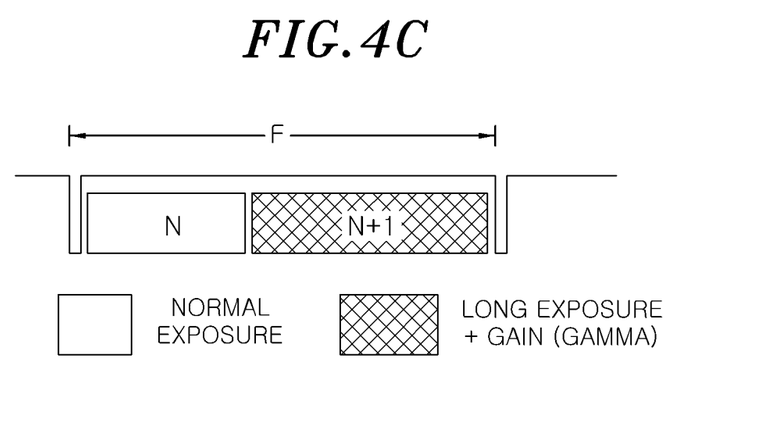
Figure 5A:
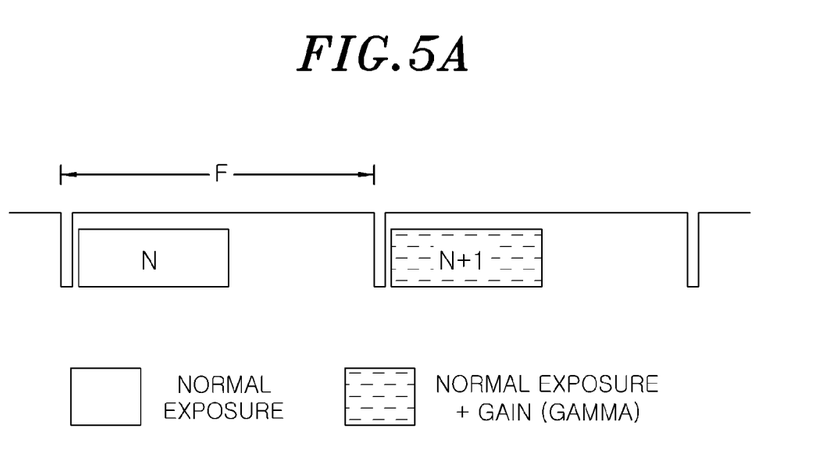
FIGS. 5A to 5C show diagrams of frames illustrating another example of a scanning process derived from a method for an optical fingerprint recognition using a multiple exposure in accordance with an embodiment of the present invention
Figure 5B:
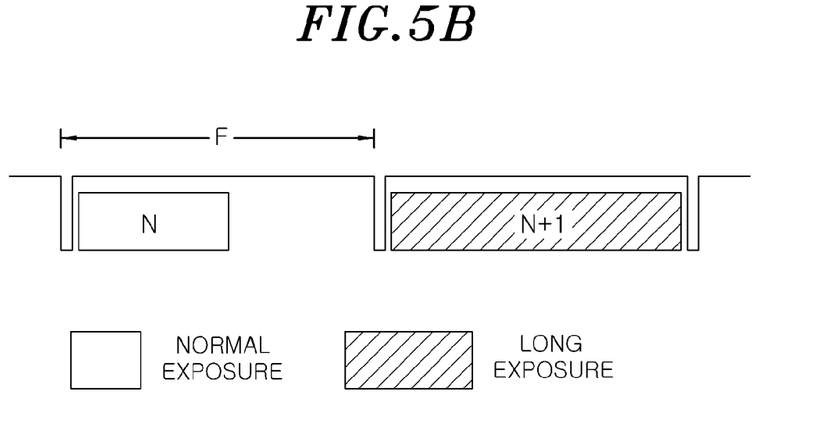
Figure 5C:
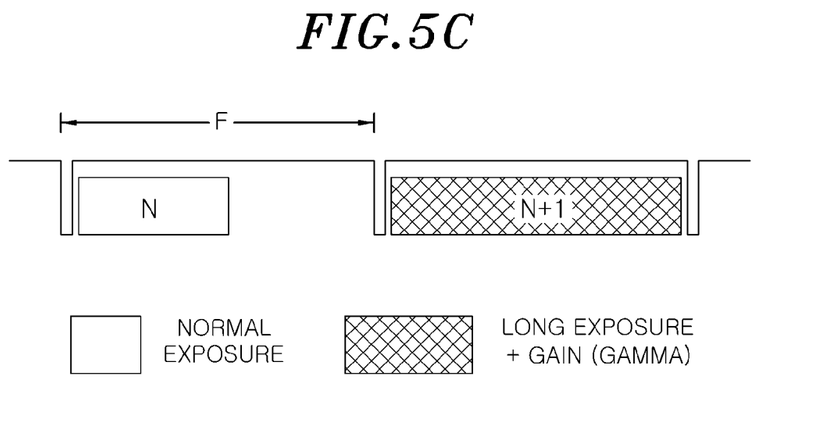

As illustrated in FIGS. 4A to 4C, the fingerprint image scanning unit 110 may multiply scan a fingerprint image while alternating the exposure conditions within one frame F. For example, as illustrated in FIG. 4A, the fingerprint image scanning unit 110 may separately scan a fingerprint image with a scan condition which has been changed to have both a normal exposure and other normal exposure accompanied by a gain control or gamma control within one frame F. Alternatively, as illustrated in FIG. 4B, the fingerprint image scanning unit 110 may separately scan a fingerprint image with a scan condition which has been changed to have both a normal exposure and a long exposure within one frame F. Alternatively, as illustrated in FIG. 4C, the fingerprint image scanning unit 110 may separately scan a fingerprint image with a scan condition which has been changed to have both a normal exposure and a long exposure accompanied by a gain control or gamma control within one frame F. Further alternatively, as illustrated in FIGS. 5A to 5C, the fingerprint image scanning unit 110 may multiply scan a fingerprint image while alternating the exposure conditions in a frame (F) unit. For example, as illustrated in FIG. 5A, the fingerprint image scanning unit 110 may separately scan a fingerprint image with a scan condition which has been changed to alternate a normal exposure and a normal exposure accompanied by a gain control or gamma control in a frame (F) unit. Alternatively, as illustrated in FIG. 5B, the fingerprint image scanning unit may separately scan a fingerprint image with a scan condition which has been changed to alternate a normal exposure and a long exposure in a frame (F) unit. Alternatively, as illustrated in FIG. 5C, the fingerprint image scanning unit may separately scan a fingerprint image with a scan condition which has been changed to alternate a normal exposure and a long exposure accompanied by a gain control or gamma control in a frame (F) unit.

Subsequently, the image determination unit 130 perceives a darkness level of a fingerprint image scanned by the normal exposure through the use of the fingerprint image scanning unit 110, in operation S220, and determines whether the input fingerprint is the dry fingerprint in accordance with a comparison result between the perceived darkness level and a predetermined darkness level, in operation S230. By way of example, the image determination unit 130 may determine that the input fingerprint is the dry fingerprint when the fingerprint image is extremely bright or blurry because the darkness level of the fingerprint image scanned with the normal exposure is greater than the predetermined darkness level.

In this case, when it is determined that the input fingerprint is not the dry fingerprint, the fingerprint image selection unit 145 in the fingerprint recognition module 140 selects the fingerprint image derived from the first scan condition 'N' and provides the selected fingerprint image to the fingerprint interpretation unit 147, in operation S241. The fingerprint interpretation unit 147 then applies the fingerprint image derived from the first scan condition to a fingerprint recognition so that the input fingerprint can be interpreted and recognized, in operation S250.

However, when it is determined that the input fingerprint is the dry fingerprint, the fingerprint image selection unit 145 in the fingerprint recognition module 140 selects a fingerprint image derived from the second scan condition "N+1", as illustrated in FIGS. 4A to 4C and FIGS. 5A to 5C, and provides the selected fingerprint image to the fingerprint interpretation unit 147, in operation S242.

The fingerprint interpretation unit 147 then applies the fingerprint image derived from the long exposure or the fingerprint image derived from the gain- or gamma-controlled normal exposure to a fingerprint recognition so that the input fingerprint can be interpreted and recognized, in operation S250. During the fingerprint recognition, another fingerprint image will not be acquired or feed-backed in order to obtain additional information.

Alternatively, when the image determination unit 130 determines that the input fingerprint is the dry fingerprint, the fingerprint image synthesizing unit 141 in the fingerprint recognition module 140 synthesizes a fingerprint image derived from the first scan condition 'N' and a fingerprint image derived from the second scan condition 'N+1', and the fingerprint image selection unit 145 selects a synthesized fingerprint image of the fingerprint images derived from the first and second scan conditions to provide the synthesized fingerprint image to the fingerprint interpretation unit 147, in operation S243.

Then, the fingerprint interpretation unit 147 applies the synthesized fingerprint image derived from the first scan condition and the second scan condition to a fingerprint recognition so that the input fingerprint can be interpreted and recognized, in operation S250.

Alternatively, the image determination unit 130 determines that the input fingerprint is the dry fingerprint, the fingerprint image differential unit 143 in the fingerprint recognition module 140 defines a following exposure time using the difference between a fingerprint image derived from the first scan condition 'N' and a fingerprint image derived from the second scan condition 'N+1' and provides the defined following exposure time to the scan condition setting unit 120, in operation S245. By way of example, the fingerprint image differential unit 143 may calculate a suitable value for the exposure time by using a lookup table.

The fingerprint image scanning unit 110 then newly scans a fingerprint image in compliance with an exposure condition with the calculated following exposure time, which has been set by the scan condition setting unit 120, and the fingerprint image selection unit 145 provides the newly scanned fingerprint image to the fingerprint interpretation unit 147, in operation S246. In this case, when fingerprint images are obtained, by the fingerprint scanning unit 110, using a normal exposure and other exposure having a following exposure time in sequence in a next frame and the next but one frame, a fingerprint image derived from the other exposure having the following exposure time will be applied for the fingerprint recognition.

Thereafter, the fingerprint interpretation unit 147 applies the newly scanned fingerprint image under the scan condition including the following exposure time to a fingerprint recognition so that the input fingerprint can be interpreted and recognized, in operation S250.

The combinations of the each block of the block diagram and each operation of the flow chart may be derived from computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in computer readable memory or a memory usable in a computer which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions derived from the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of the exemplary embodiments of the present invention, and it will be understood by those skilled in the art to which this invention belongs that various changes and modifications may be made without departing from the scope of the essential characteristics of the embodiments of the present invention. Therefore, the exemplary embodiments disclosed herein are not used to limit the technical idea of the present invention, but to explain the present invention, and the scope of the technical idea of the present invention is not limited to these embodiments. Therefore, the scope of protection of the present invention should be construed as defined in the following claims and changes, modifications and equivalents that fall within the technical idea of the present invention are intended to be embraced by the scope of the claims of the present invention.

What is claimed is:

1. A method for an optical fingerprint recognition, the method comprising:
    scanning a plurality of fingerprint images using a multiple scan which allows alternating a first scan condition and a second scan condition;
    determining whether an input fingerprint is a dry fingerprint depending on a darkness level of a fingerprint image that has been derived from the first scan condition and selected from among the plurality of scanned fingerprint images; and
    performing a fingerprint recognition using the scanned fingerprint image that has been derived from the first scan condition or using another of the scanned fingerprint images that has been derived from the second scan condition in accordance with the determination result as to the dry fingerprint,
    wherein an exposure time of the first scan condition is different from that of the second scan condition and a region scanned by the multiple scan using the first scan condition is the same as that scanned by the multiple scan using the second scan condition,
    wherein said performing the fingerprint recognition comprises:
    defining a following exposure time, wherein the following exposure time is derived from the difference between the fingerprint image derived from the first scan condition and the fingerprint image derived from the second scan condition;
    newly scanning a fingerprint image under a scan condition having the following exposure time; and
    applying the newly scanned fingerprint image to the fingerprint recognition.

2. The method of claim 1, wherein said scanning fingerprint images using a multiple scan comprises:
    applying the first scan condition and the second scan condition in sequence within one frame.

3. The method of claim 1, wherein said scanning fingerprint images using a multiple scan comprises:
    applying the first scan condition and the second scan condition in sequence in a frame unit.

4. The method of claim 1, wherein the first scan condition is a normal exposure condition permitting a predetermined exposure time, and the second scan condition is a long exposure condition permitting an exposure time longer than the predetermined exposure time.

5. The method of claim 1, wherein the first scan condition is a normal exposure condition permitting a predetermined exposure time, and the second scan condition is a long exposure condition permitting an exposure time longer than the predetermined exposure time and being accompanied by a gain control or gamma control.

6. The apparatus for an optical fingerprint recognition, the apparatus comprising:
    a processor programmed with instructions that, when executed, cause the processor to:
    multiply scan a plurality of fingerprint images using a multiple scan which allows alternating a first scan condition and a second scan condition;
    set a scan condition which allows alternating the first scan condition and the second scan condition at the time of scanning the fingerprint image;
    determine whether an input fingerprint is a dry fingerprint depending on a darkness level of a fingerprint image that has been derived from the first scan condition and selected from among the plurality of scanned fingerprint images; and
    perform the fingerprint recognition using the scanned fingerprint image that has been derived from the first scan condition or using another of the scanned fingerprint images that has been derived from the second scan condition in accordance with the determination result as to the dry fingerprint, wherein an exposure time of the first scan condition is different from that of the second scan condition and a region scanned by the multiple scan using the first scan condition is the same as that scanned by the multiple scan using the second scan condition, wherein the fingerprint recognition is configured to define a following exposure time using the difference between the fingerprint image derived from the first scan condition and the fingerprint image derived from the second scan condition, newly scan a fingerprint image under a scan condition having the following exposure time, and apply the newly scanned fingerprint image to the fingerprint recognition.

7. The apparatus of claim 6, wherein the fingerprint image scanning unit is configured to apply the first scan condition and the second scan condition in sequence within one frame.

8. The apparatus of claim 6, wherein the fingerprint image scanning unit is configured to apply the first scan condition and the second scan condition in sequence in a frame unit.

9. The apparatus of claim 6, wherein the first scan condition is a normal exposure condition permitting a predetermined exposure time, and the second scan condition is a long exposure condition permitting an exposure time longer than the predetermined exposure time.

10. The apparatus of claim 6, wherein the first scan condition is a normal exposure condition permitting a predetermined exposure time, and the second scan condition is a long exposure condition permitting an exposure time longer than the predetermined exposure time and being accompanied by a gain control or gamma control.

* * * * *